LICENSE-PLATE FASTENING MEANS
Filed March 23, 1966
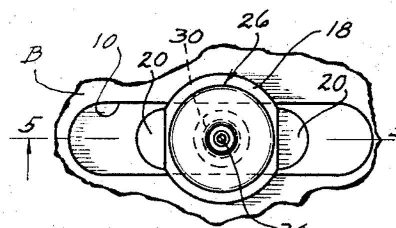
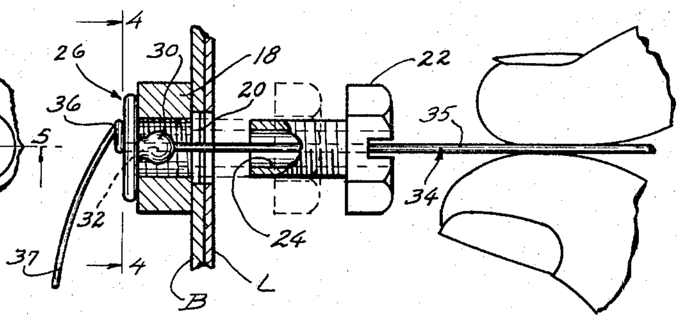
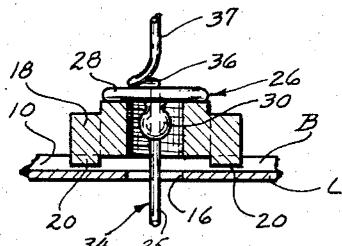
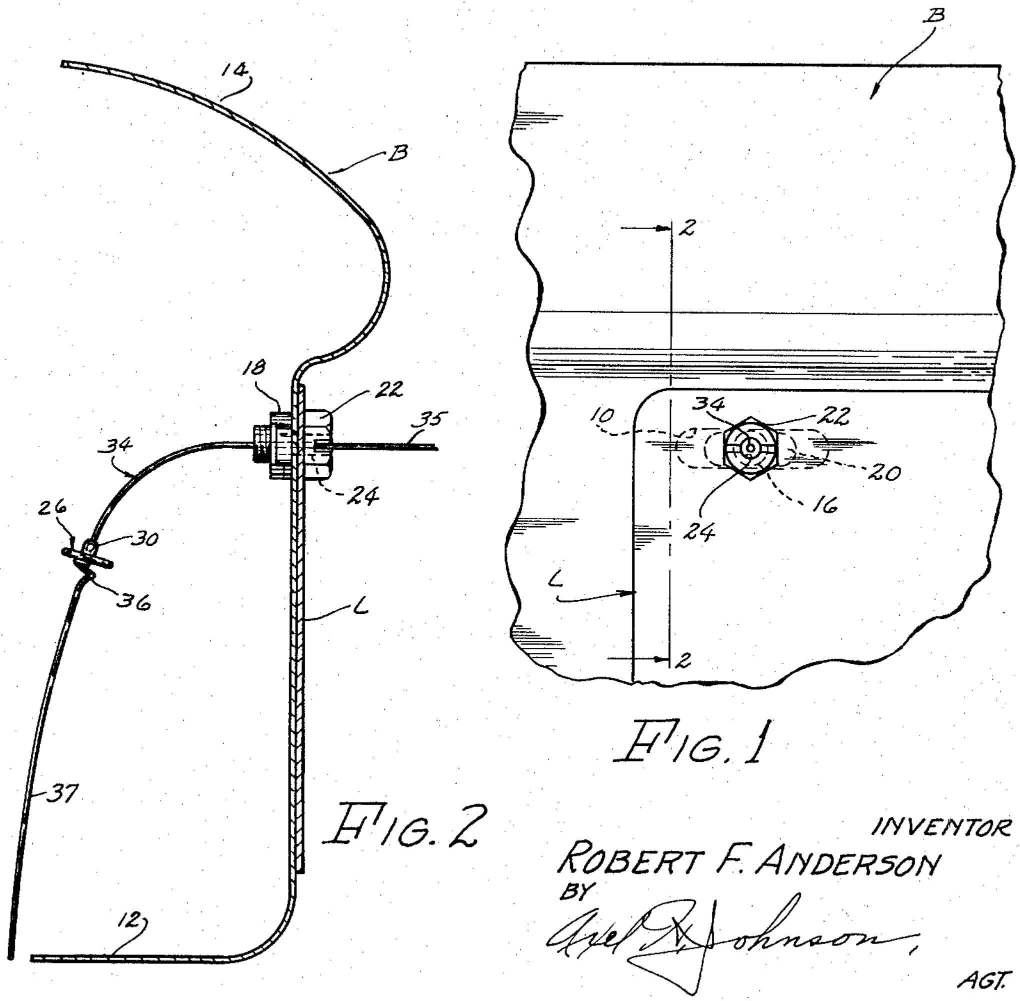
INVENTOR
ROBERT F. ANDERSON
BY
Axel A. Johnson,
AGT.

United States Patent Office 3,377,729

Patented Apr. 16, 1968

3,377,729

LICENSE-PLATE FASTENING MEANS

Robert F. Anderson, 825 Wisconsin Ave., Racine, Wis. 53403

Filed Mar. 23, 1966, Ser. No. 536,773
1 Claims. (Cl. 40—209)

ABSTRACT OF THE DISCLOSURE

A means to facilitate mounting a license plate on an automobile frame or bumper when the end of the bolt is not easily reached in order to apply the nut thereto. In this means, the nut is strung on a wire or similar member which is inserted in the mounting hole from the rear of the frame, and is made to extend forwardly of the plate to be secured. The bolt has an axial bore to permit it to be strung on the forwardly-protruding portion of the wire. It is then shifted therealong to threadedly engage the nut and be threadedly secured to the nut while the wire is held taut. The wire member is then withdrawn rearwardly.

This invention relates to a means of fastening license plates to the bumpers of automobiles.

Modern automobiles have formed bumpers or frames that make it difficult to mount license plates thereon, in that the bumper or frame is of a box-like construction that prevents the hand from reaching the bolt from the rear in order to apply the nut thereon. It is an object therefore, of this invention to provide a means of "threading" a nut into position against the rear face of the bumper and on the fastening screw.

Further objects and advantages of this invention will become apparent from a consideration of the following detailed description taken in connection with the accompanying drawings wherein an embodiment of the invention is shown. It is, however, to be understood that the invention is not limited to the details disclosed, but includes all such variations as fall within the spirit of the invention.

Referring to the drawing:

FIG. 1 is a fragmentary front view of an automobile bumper with a license plate mounted thereon.

FIG. 2 is a section taken at 2—2 of FIG. 1.

FIG. 3 is an enlarged sectional, axial view showing the screw being "threaded" or assembled into its nut.

FIG. 4 is a view taken at 4—4 of FIG. 3.

FIG. 5 is a section taken at 5—5 of FIG. 4.

Bumper frame B is of a box form as in FIG. 2, and is provided with a suitable elongated aperture 10. Bumper B terminates in a rearwardly-extending flange 12 at the lower edge thereof, and at the upper edge into the portion 14. This shape makes it difficult to reach the screw in order to apply the nut thereto.

License plate L is provided with a circular aperture 16 in this instance. A nut 18 having a suitable thread, is provided with ears 20 that engage aperture 10 and prevent nut 18 from turning about its axis relative to the aperture. A screw 22, suitably threaded to engage nut 18, is provided with an axial bore 24.

A centering means 26 is next provided, having a base portion 28 and a spherical projection 30 of a diameter slightly less than the bore 24 of screw 22. Centering means 26 has an axial bore 32.

A length of wire or other slender, rigid material 34, of a suitable length, is provided with a knot or kink 36 or similar axial obstruction, so as to define a forward portion 35 and a rearward portion 37.

When a license plate is to be mounted, rearward portion 37 is held in one hand and centering means 26 is strung on portion 35 adjacent knot or kink 36, as shown in FIG. 3. Nut 18 is likewise "strung" upon portion 35 adjacent centering means 26 with the projection 30 within the bore of nut 18. Portion 35 is then directed upwardly and forwardly within bumper frame B to pass through aperture 10, and through aperture 16 of the license plate L, until portion 35 extends a sufficient distance forwardly of the bumper to be grasped by the fingers of one hand, and withdrawn until nut 18 engages aperture 10 and the rearward face of frame B. Nut 18 is held in this position by the centering means 26 as shown in FIG. 3. While being thus held, the means 26 with its projection 30 assures that wire 34 coincides with the axis of nut 18. While so holding portion 35, screw 22 is placed upon the wire and advanced toward nut 18 by the fingers of the other hand, and rotated so as to cause the threads of the screw to engage the threads in nut 18. Continued rotation of the screw 22 will then seat the head thereof in contact with the license plate L, pushing the centering means 26 axially from the nut. Wire 34 with the centering means thereon can then be withdrawn rearwardly from the axial bore of the screw 22 and discarded. Screw 22 can then be finally driven tightly with a screw driver.

This invention thus provides a means of fastening a license plate without requiring the person to lie prone and cause damage to his clothing.

The above being a complete description of an illustrative embodiment of the invention, what is claimed as new and desired to be secured by Letters Patent of the United States is:

1. A means of affixing a license plate to an automobile frame, said frame having a rearward face and a first aperture, and said plate having a second aperture, said apertures being in axial alignment, said means comprising, in combination an elongated flexible member having an abutment thereon, said flexible member characterized by forward and rearward portions with respect to said abutment, a female member having a threaded bore and a minimum dimension larger than the minimum dimension of said apertures and provided with means engaging said frame to prevent rotation, and positioned on said forward portion rearwardly of said frame, a centering means slidable on said forward portion and engaging said abutment, and comprising a transversely-extending base portion having a minimum dimension greater than the diameter of said threaded bore, and greater than the minimum dimension of said apertures, and a forwardly-directed projection extending within said bore, said projection having a curved front face and being of a diameter less than said bore, a male threaded member having an axial bore, positioned axially on said forward portion, and displaced rearwardly on said forward portion to threadedly engage said female member and to axially displace said centering means and said flexible member rearwardly relative to said female member.

References Cited

UNITED STATES PATENTS

| | | | |
|---|---|---|---|
| 1,902,454 | 3/1933 | Kinton | 85—60 |
| 1,928,527 | 9/1933 | Fortinberry | 85—60 |
| 2,765,134 | 10/1956 | Hill. | |

EDWARD C. ALLEN, *Primary Examiner.*